United States Patent
Chueh

(10) Patent No.: US 7,817,312 B2
(45) Date of Patent: Oct. 19, 2010

(54) IMAGE ACQUIRING DEVICE HAVING AN OPTICAL SIGNAL TRANSMISSION MEDIUM

(75) Inventor: Chuang-Hua Chueh, Hsin Chu (TW)

(73) Assignee: Avision Inc. (TW)

( * ) Notice: Subject to any disclaimer, the term of this patent is extended or adjusted under 35 U.S.C. 154(b) by 517 days.

(21) Appl. No.: 11/882,041

(22) Filed: Jul. 30, 2007

(65) Prior Publication Data

US 2008/0043296 A1 Feb. 21, 2008

(30) Foreign Application Priority Data

Aug. 18, 2006 (TW) .............................. 95130352 A

(51) Int. Cl.
*H04N 1/04* (2006.01)
*H04N 1/40* (2006.01)
*H04B 10/12* (2006.01)

(52) U.S. Cl. ...................... 358/497; 358/474; 358/468; 358/445; 398/141

(58) Field of Classification Search ................. 358/497, 358/494, 474, 468, 445, 1.15; 398/141
See application file for complete search history.

(56) References Cited

U.S. PATENT DOCUMENTS

| 6,075,240 A | 6/2000 | Watanabe et al. |
| 2004/0042036 A1* | 3/2004 | Kodera et al. ............... 358/1.15 |
| 2005/0063707 A1* | 3/2005 | Imai ........................... 398/141 |

FOREIGN PATENT DOCUMENTS

TW 200511820 9/1992

* cited by examiner

*Primary Examiner*—Cheukfan Lee

(57) ABSTRACT

An image acquiring device includes a scanning module, an optical signal transmission medium and a mainboard module. In the scanning module having a rechargeable battery, a scanning unit scans a document to obtain an electrical document signal, a first signal converter is connected to the scanning unit and converts the electrical document signal into an optical document signal, and a first signal transmitting unit is connected to the first signal converter and receives and outputs the optical document signal. The optical signal transmission medium is connected to the first signal transmitting unit. On a mainboard of the mainboard module, a second signal input/output unit is connected to the optical signal transmission medium and receives the optical document signal, and a second signal converter is connected to the second signal input/output unit and converts the optical document signal into the electrical document signal.

9 Claims, 4 Drawing Sheets

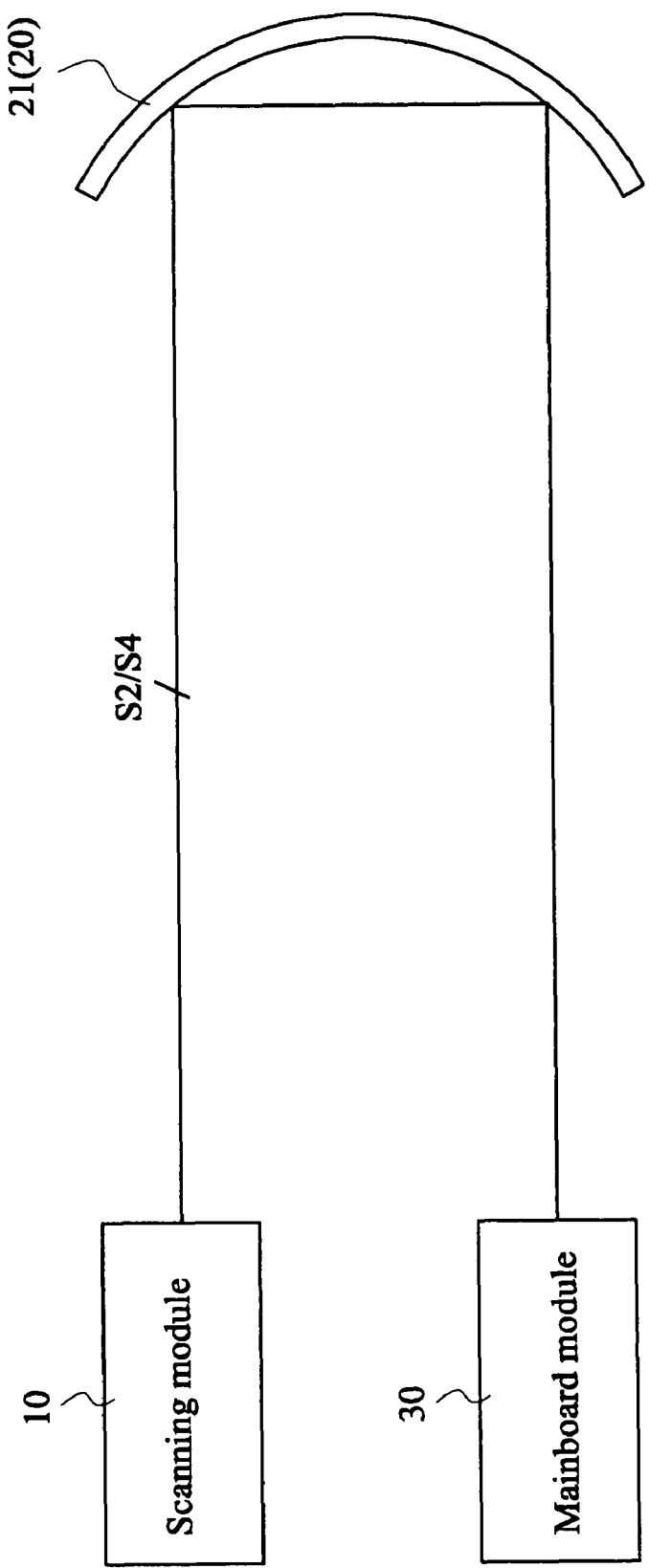

IMAGE ACQUIRING DEVICE HAVING AN OPTICAL SIGNAL TRANSMISSION MEDIUM

BACKGROUND OF THE INVENTION

1. Field of Invention

The invention relates to an image acquiring device, and more particularly to an image acquiring device having an optical signal transmission medium.

2. Related Art

A conventional flatbed scanner includes a housing, a scanning module and a circuit board module. Both of the scanning module and the circuit board module are disposed inside the housing, and the scanning module moves back and forth in the housing to scan an image of a document. The scanning module scans the document to obtain an image signal, which is usually transmitted to the circuit board module from the scanning module through a flexible flat cable (FFC).

However, with the increase in the number of movement of the scanning module, the FFC is frequently pulled and curled up. In a serious situation, metal wires in the FFC may be broken. In addition, unpredictable electromagnetic waves generated due to the rapid current change in the scanner may create problems of the electromagnetic compatibility (EMC) or electromagnetic interference (EMI), which consequently influence the correctness of the signal transmitted by the FFC.

SUMMARY OF THE INVENTION

It is therefore an object of the invention to provide an image acquiring device having an optical signal transmission medium, wherein problems of EMC and EMI are solved by way of optical signal transmission.

To achieve the above-identified object, the invention provides an image acquiring device, which includes a scanning module, an optical signal transmission medium and a mainboard module. The scanning module includes a scanning unit, a first signal converter and a first signal transmitting unit. The scanning unit scans a document to obtain an electrical document signal. The first signal converter is connected to the scanning unit and converts the electrical document signal into an optical document signal. The first signal transmitting unit is connected to the first signal converter and receives and outputs the optical document signal. The optical signal transmission medium is connected to the first signal transmitting unit. The mainboard module includes a mainboard, a second signal input/output unit and a second signal converter. The second signal input/output unit is mounted on the mainboard and connected to the optical signal transmission medium, and receives the optical document signal. The second signal converter is mounted on the mainboard and connected to the second signal input/output unit, and converts the optical document signal into the electrical document signal. The mainboard processes the electrical document signal. The scanning module is movable relative to the mainboard. The scanning module further includes a rechargeable battery, which is charged when the scanning module is resting at a home position, and is discharged when the scanning module moves away from the home position to serve as a stand-alone power source for the scanning module.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a schematic illustration showing signal transmission in an image acquiring device according to a third embodiment of the invention.

DETAILED DESCRIPTION OF THE INVENTION

The present invention will be apparent from the following detailed description, which proceeds with reference to the accompanying drawings, wherein the same references relate to the same elements.

Figure 1:
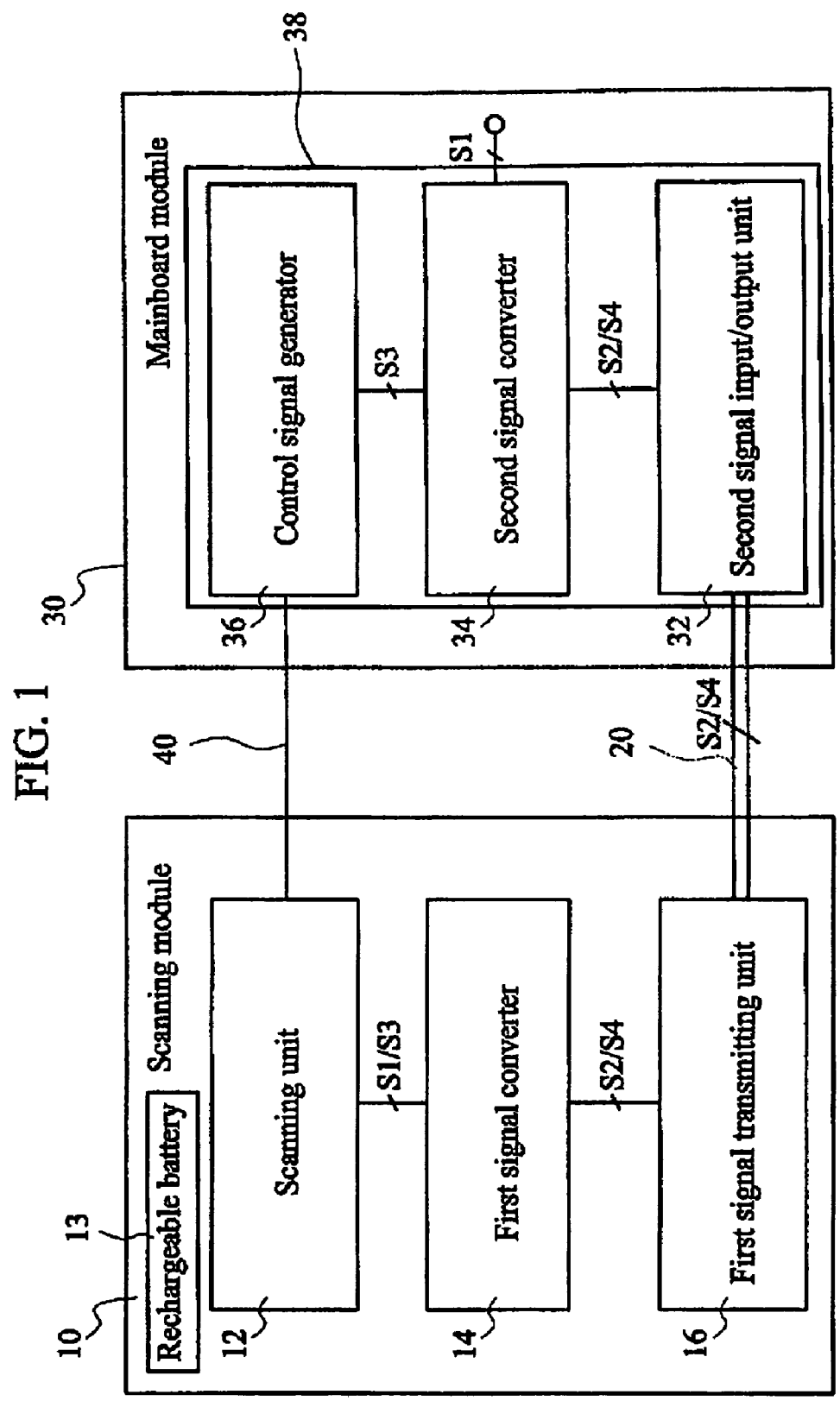
FIG. 1 is a schematic block diagram showing an image acquiring device according to a first embodiment of the invention.

FIG. 1 is a schematic block diagram showing an image acquiring device according to a first embodiment of the invention. Referring to FIG. 1, the image acquiring device of this embodiment includes a scanning module 10, an optical signal transmission medium 20 and a mainboard module 30.

The scanning module 10 includes a scanning unit 12, a first signal converter 14 and a first signal transmitting unit 16. The scanning unit 12 scans a document to obtain an electrical document signal S1. The first signal converter 14 is connected to the scanning unit 12 and converts the electrical document signal S1 into an optical document signal S2. The first signal transmitting unit 16 is connected to the first signal converter 14 and receives and outputs the optical document signal S2. The optical signal transmission medium 20 is connected to the first signal transmitting unit 16. In this embodiment, the optical signal transmission medium 20 is an optical fiber.

The mainboard module 30 includes a mainboard 38, a second signal input/output unit 32 and a second signal converter 34. The second signal input/output unit 32 is mounted on the mainboard 38 and connected to the optical signal transmission medium 20, and receives the optical document signal S2. The second signal converter 34 is mounted on the mainboard 38 and connected to the second signal input/output unit 32, and converts the optical document signal S2 into the electrical document signal S1. The mainboard 38 processes the electrical document signal and controls the other units.

The mainboard module 30 may further include a control signal generator 36, which is mounted on the mainboard 38 and connected to the second signal converter 34, for generating an electrical control signal S3.

It is to be noted that the scanning module 10 and the mainboard module 30 may be electrically connected to each other through an additional wired cable 40. The wired cable 40 can provide the power from the mainboard module 30 to the scanning module 10 and may also transmit the electrical control signal 53 from the mainboard module 30 to the scanning module 10. Alternatively, the wired cable 40 may also be omitted, for the scanning module 10 may have a stand-alone power source. In this case, the scanning module 10 may have a rechargeable battery 13. When the scanning module 10 is resting at a home position, the rechargeable battery 13 may be charged to store the required power for the subsequent operation. When the scanning module 10 moves away from the home position, the rechargeable battery 13 is no longer charged but is discharged.

When the wired cable 40 does not transmit the electrical control signal S3, the electrical control signal S3 may also be transmitted to the scanning module 10 through the optical signal transmission medium 20. In this case, the second signal converter 34 may further convert the electrical control signal S3 into an optical control signal S4. The second signal input/output unit 32 further outputs the optical control signal S4 to the first signal transmitting unit 16 through the optical signal transmission medium 20. The first signal converter 14 converts the optical control signal S4 into the electrical control signal S3 to control the operation of the scanning unit 12.

Figure 2:
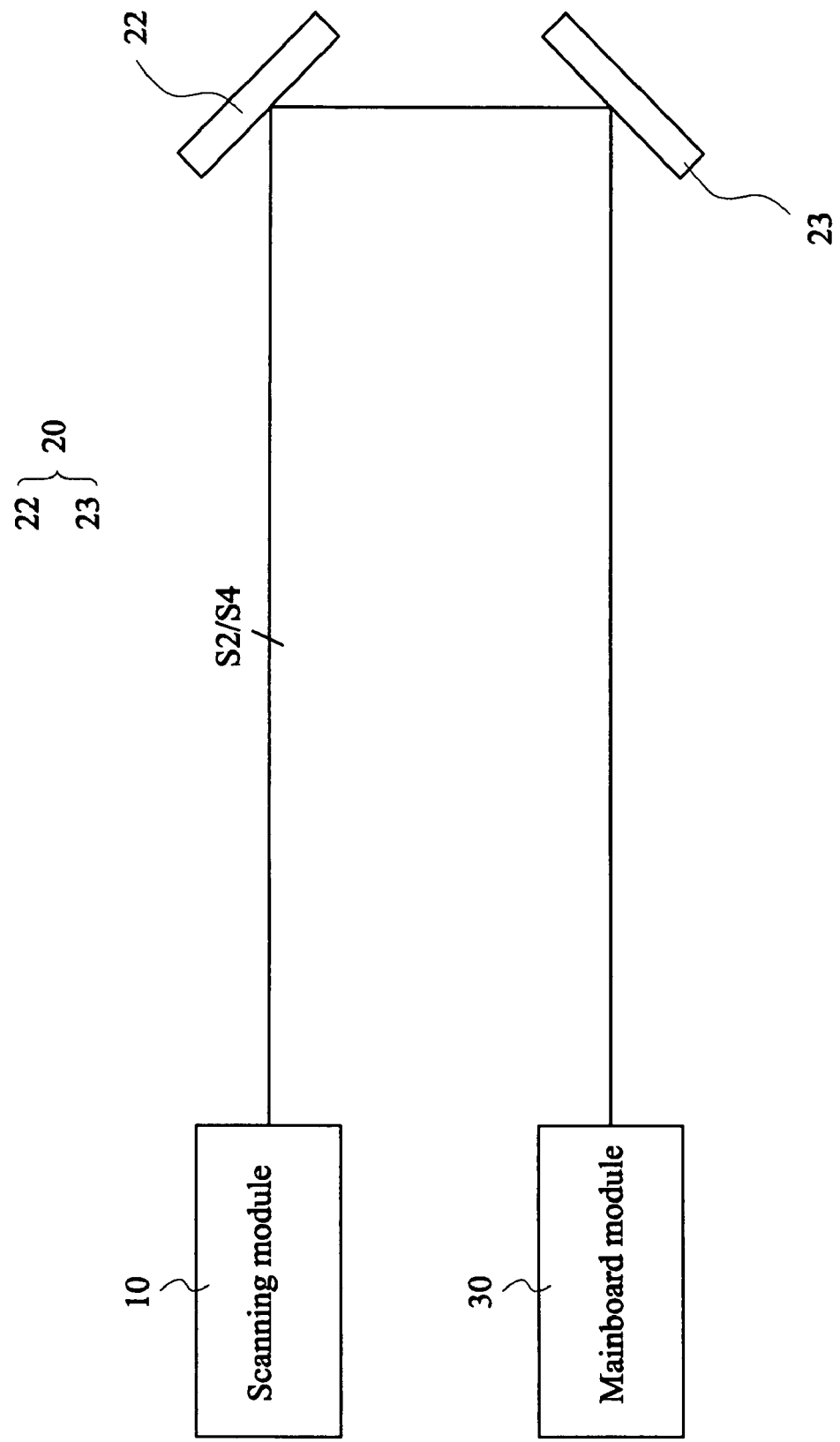
FIGS. 2 and 3 are schematic illustrations showing signal transmission in an image acquiring device according to a second embodiment of the invention.
Figure 3:
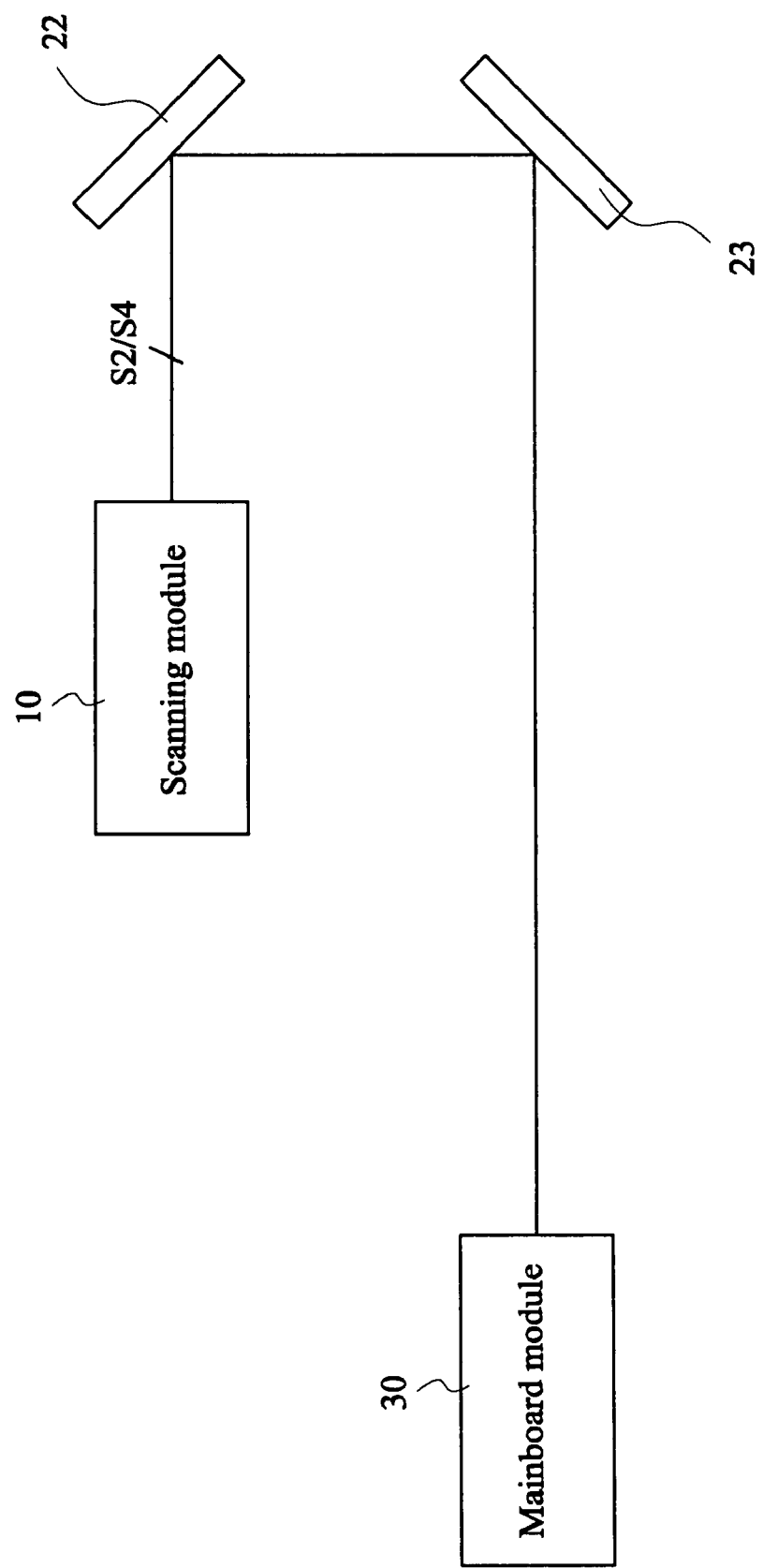

FIGS. 2 and 3 are schematic illustrations showing signal transmission in an image acquiring device according to a second embodiment of the invention. As shown in FIGS. 2 and 3, the optical signal transmission medium 20 of this embodiment is a reflecting mirror set including two flat mirrors 22 and 23, which are arranged such that an optical path from the scanning module 10 to the flat mirror 22 is in parallel with an optical path from the flat mirror 23 to the mainboard module 30. Thus, the optical signal transmitting and receiving operations can be effectively kept when the scanning module 10 is being moved relative to the mainboard module 30 from the state of FIG. 2 to the state of FIG. 3.

FIG. 4 is a schematic illustration showing signal transmission in an image acquiring device according to a third embodiment of the invention. In this embodiment, the optical signal transmission medium 20 is a reflecting mirror set including a curved mirror 21 for transmitting and receiving the optical signal effectively.

Because the signal transmission capacity of the optical signal transmission medium is higher than that of the conventional FFC and the optical signal transmission is free from the problems of EMI and EMC, the effectiveness of the invention is better than that of the prior art. In addition, the optical signal transmission medium is also free from the problem that the metal wires are broken after being used for a long period of time.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. An image acquiring device, comprising:
   a scanning module, which comprises:
      a scanning unit for scanning a document to obtain an electrical document signal;
      a first signal converter, connected to the scanning unit, for converting the electrical document signal into an optical document signal; and
      a first signal transmitting unit, connected to the first signal converter, for receiving and outputting the optical document signal;
   an optical signal transmission medium connected to the first signal transmitting unit; and
   a mainboard module, which comprises:
      a mainboard;
      a second signal transmitting unit, mounted on the mainboard and connected to the optical signal transmission medium, for receiving the optical document signal; and
      a second signal converter, mounted on the mainboard and connected to the second signal transmitting unit, for converting the optical document signal into the electrical document signal; wherein:
         the scanning module is movable relative to the mainboard; and
         the scanning module further comprises a rechargeable battery, which is charged when the scanning module is resting at a home position, and is discharged when the scanning module moves away from the home position to serve as a stand-alone power source for the scanning module.

2. The device according to claim 1, wherein the optical signal transmission medium is an optical fiber.

3. The device according to claim 1, wherein the mainboard module further comprises a control signal generator, mounted on the mainboard, for generating an electrical control signal.

4. The device according to claim 3, wherein the second signal converter, connected to the second signal converter, converts the electrical control signal into an optical control signal.

5. The device according to claim 4, wherein the second signal transmitting unit further outputs the optical control signal to the first signal transmitting unit through the optical signal transmission medium.

6. The device according to claim 5, wherein the first signal converter converts the optical control signal into the electrical control signal to control an operation of the scanning unit.

7. The device according to claim 1, wherein the optical signal transmission medium is a reflecting mirror set.

8. The device according to claim 7, wherein the reflecting mirror set comprises a curved mirror.

9. The device according to claim 7, wherein the reflecting mirror set comprises two flat mirrors.

* * * * *